Jan. 7, 1969      J. P. LAVASH      3,420,055
FUEL CONTROL SYSTEMS
Filed Dec. 29, 1966
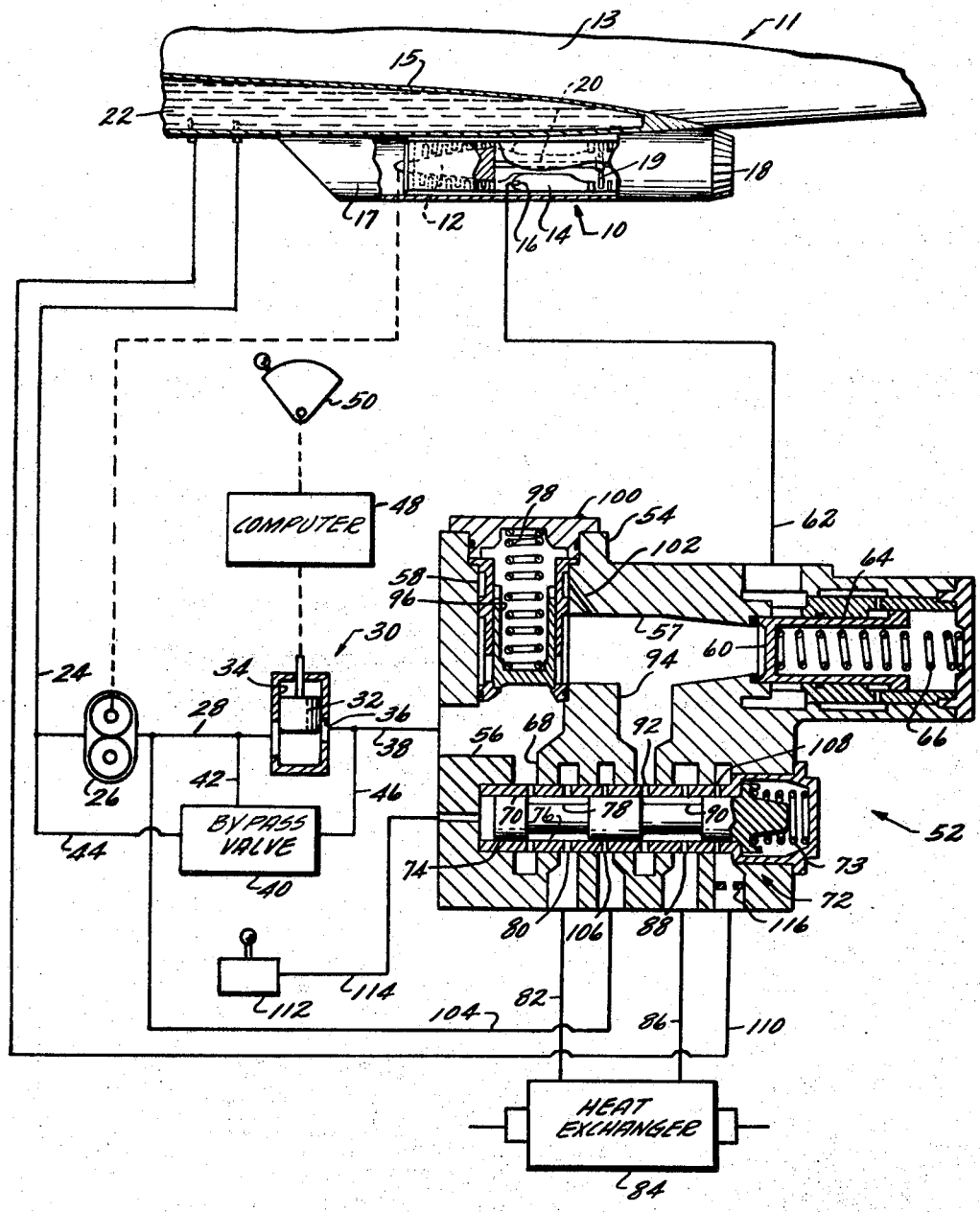
INVENTOR.
JOHN P. LAVASH
BY
ATTORNEY (United States Patent Office — 3,420,055 — Patented Jan. 7, 1969)

3,420,055
FUEL CONTROL SYSTEMS
John P. Lavash, Cincinnati, Ohio, assignor to General Electric Company, a corporation of New York
Filed Dec. 29, 1966, Ser. No. 605,788
U.S. Cl. 60—39.28    5 Claims
Int. Cl. F02g *3/00;* F02c *9/04;* F02c *7/12*

ABSTRACT OF THE DISCLOSURE

The disclosure shows a fuel delivery system for a gas turbine engine wherein a positive displacement pump is driven by the engine rotor. In normal operation a scheduled amount of fuel is metered for delivery to the engine combustor. The metered fuel flows through a heat exchanger to cool oil employed in the engine. During conditions of high rotor speeds and high pump outputs occurring where a small amount of fuel is desired for delivery to the engine combustor, means are provided for diverting a portion of the pump output from the scheduling means to the heat exchanger. This minimized the amount of fuel which would be throttled through a bypass valve to maintain a desired pressure differential across the metering valve. In this fashion, excessive heat input to the fuel is avoided.

---

The invention described and claimed in the U.S. patent application herein resulted from work done under U.S. Government contract FA–SS–64–1. The U.S. Government has an irrevocable, non-exclusive license under said application to practice and have practiced the invention claimed herein, including the unlimited right to sublicense others to practice and have practiced the claimed invention for any purpose whatsoever.

The present invention relates to improvements in fuel control systems and more particularly to improvements in fuel control systems for gas turbine engines.

Fuel control systems for modern gas turbine engines for aircraft propulsion generally comprises a fuel pump, driven by the rotor of the engine, which pressurizes a source of fuel for delivery to a fuel flow controller. The fuel flow controller schedules flow of fuel to a series of fuel nozzles for injection into a combustor as a function of a number of control inputs.

One of the characteristics of this type of system is that as flow through the fuel nozzles increases, their back pressure increases. Since the increase in pressure output of the fuel pump does not necessarily follow the increase in back pressure of the fuel nozzles, the pump is sized to produce an excess output for all but the maximum flow requirements of the nozzles. The pressure output of the pump is then controlled to match the back pressure variations of the nozzles by a pressure regulating bypass valve which throttles the excess pump output to a low pressure point, usually the pump inlet. This throttling action generates a heat input to the fuel which is generally dependent on the pressure drop and flow across the bypass valve.

When the fuel is used to cool other fluids and components in the engine and an aircraft, this addition of heat to the fuel may become a problem. A specific example is found in an engine which powers an aircraft executing an idle descent at supersonic speeds. During this maneuver, the rotational speed of the engine is high due to windmilling of the engine rotor, thus causing the pump output to be nearly maximum. At the same time, the flow through the fuel nozzles is minimal. As a result, an excessive amount of fuel is throttled from the relatively high pressure outlet of the pump to its inlet, thereby adding a substantial amount of heat which impairs the ability of the fuel to act as a cooling medium for the aircraft and engine components.

Accordingly, the object of the invention is to provide a simplified, effective fuel control system for a gas turbine engine which minimizes heat input to the fuel.

It is a further object to provide the above ends in a gas turbine engine used to power an aircraft which uses the fuel as a cooling medium.

In its broader aspects, the invention achieves the above ends in a fuel delivery system for a gas turbine engine having a combustor. The fuel delivery system comprises a fuel pump for pressurizing fuel, the fuel pump having an output increasing with an increasing rate of engine operation. Means receiving the output of the fuel pump are provided for scheduling flow of fuel. Nozzle means receiving the output of the scheduling means are provided for injecting the fuel into the combustor, the nozzle means having a back pressure which increases with an increasing rate of flow therethrough.

Means are provided for throttling a portion of the output of the fuel pump to a low pressure point for maintaining the pressure output of the pump at a level required by the nozzle means. Means are provided for selectively providing a relatively low resistance flow path from the pump to a low pressure point when the rate of engine operation is high and the flow rate through the nozzle means is low. Therefore, the amount of fuel throttled to the low pressure point and the heat input to the fuel is minimized when the rate of operation of the engine is at a maximum and the flow through the nozzle means is low.

In another aspect the objects of this invention are achieved by providing the above fuel delivery system and gas turbine engine in combination with an aircraft having a fuel tank storing a relatively large mass of fuel. The fuel delivery system comprises a supply conduit providing a flow path from the tank to the fuel pump. Additional conduit means provide a flow path from the throttling means to the supply conduit upstream of the fuel pump. A return conduit provided a flow path from the selective flow path means to the tank whereby the fuel passing through the low resistance flow path to the tank generates substantially no increase in the temperature of the fuel in the tank.

The above and other related objects and features of the present invention will be apparent from the reading of the disclosure found in the accompanying drawing and the novelty thereof pointed out in the appended claims.

The drawing illustrates portions of an aircraft powered by a gas turbine engine having a fuel control system embodying the present invention.

Reference is had to the single figure which shows in simplified fashion those portions of an aircraft 11 powered by a gas turbine engine 10. The aircraft 11 has a fuselage 13 and wings 15 extending therefrom. An engine nacelle 17, supported by the wing, provides a housing for the engine 10. The gas turbine engine 10 comprises a compressor 12 which pressurizes air from the inlet of the nacelle 17 for discharge to a combustor 14 wherein fuel is injected from a series of nozzles 16 and the resultant fuel air mixture ignited to generate a hot gas stream. The hot gases are discharged through an exhaust nozzle 18 to provide propulsive force for the engine 10. A portion of the energy of the hot gas stream powers a turbine 19 to drive the compressor 12 through an interconnecting shaft 20.

The fuel nozzles 16 are supplied by a fuel control system which is supplied with fuel from an internal fuel tank 22 in the wings 15. A supply conduit 24 extends from the fuel tank to an engine driven, positive displacement fuel pump 26 (note the mechanical connection to the engine rotor). The positive displacement pump 26 pressurizes fuel for delivery through a conduit 28 to a metering valve 30. The metering valve 30 comprises piston 32 displaceable in a bore 34. The piston 32 cooperates with an outlet port 36 to form a variable area orifice for passage of fuel from the metering valve to a conduit 38. A pressure regulating bypass valve 40 is adapted to bypass pressurized fuel from conduit 28 through conduits 42 and 44 to the inlet of pump 26 whenever the pressure upstream of the metering valve 30 is greater than a predetermined pressure level above the pressure downstream of the metering valve as sensed through conduit 46. Thus, a constant pressure differential is maintained across the metering valve 30 which causes the flow metered thereby to be directly proportional to the area of the orifice formed by the piston 32 and the outlet port 36. The piston 32 receives displacement input signals from a computer 48 which is adapted to control the flow of fuel to the nozzles 16 primarily as a function of the position of a pilot control lever 50. Additional control inputs reflecting selected engine operating parameters are fed to the computer 48 for control of the metering valve piston 32 so that the flow to the engine provides optimum engine performance.

The metered flow passing through the conduit 38 passes through a valve 52 to a nozzle supply conduit 62 which extends to the nozzles 16. The valve 52 comprises a housing 54 in which an inlet passageway 56 is formed to provide a flow path from the conduit 38 through a branch passageway 68 to inlet ports 70 of a flow selector valve 72. The flow selector valve 72 comprises a spool valve element 74 displaceable in a bore 76 formed in the housing 54 and urged towards the illustrated position by a spring 73. When the spool valve 74 is in the illustrated position, an annular groove 78 provides a flow path from the inlet port 70 through a series of outlet ports 80 to a conduit 82 which extends to a heat exchanger 84. The heat exchanger 84 utilizes the fuel as a cooling medium for other fluids used in the engine 10, for example, lubricating fluid. The fuel is discharged from the heat exchanger 84 through a conduit 86 which extends to a series of return ports 88 of the flow selector valve 72. A second annular groove 90 is formed in the spool valve 74 to provide a flow path from the return ports 88 to a second series of outlet ports 92 and a branch conduit 94 to an outlet passageway 57.

A pressurizing valve 60, disposed in the outlet passageway 57, comprises a piston 64 displaceable in the passageway 57 to provide a variable restriction to flow therethrough. The piston 64 is displaced towards a closed position by a spring 66 whose rate is selected so that pressure in passageway 57 and conduit 38 is at a level to maintain the upstream pressure of the metering valve 30 sufficiently high for auxiliary hydraulic actuation purposes during relatively low fuel flows to the nozzles 16.

A valve 58 disposed between the inlet and outlet passageways 56, 57 comprises a piston 96 displaceable into the passageway 56 to provide a variable restriction to flow therethrough. A spring 98 acting against a cap 100 urges the piston 96 towards a position wherein flow from the passageway 56 to the passageway 57 is blocked. Pressure sensing passageway 102 extends from the passageway 57 downstream of the pressure regulating valve 58 to the chamber in which the spring 96 is disposed. The piston 96 is then displaced to provide a flow path from passageway 56 to 57 whenever the pressure drop across the heat exchanger 84 is above a predetermined amount. As a result, the fuel flow through the heat exchanger 84 is limited to a predetermined maximum. This limiting level is selected to give the maximum flow of cooling fluid through the heat exchanger 84 that achieves efficient heat exchanger functioning.

During normal operation of the engine 10, the flow output of the pump 26 produces a higher pressure output than is required to maintain a constant pressure differential across the metering valve 30. As a result, the excess fuel is bypassed by the valve 40 to the pump inlet. This is due to the fact that the positive displacement pump 26 is sized to provide maximum flow output for the engine speed at which the nozzles 16 require a maximum fuel flow. The fuel that is bypassed is throttled as it passes through the bypass valve 40 and as a result heat input to the fuel is generated by the throttling action. During normal engine operation, the amount of fuel throttled to the bypass valve is at a tolerable level which does not substantially impair the effectiveness of the fuel as a heat exchange medium. However, there are certain operating conditions, particularly in supersonic aircraft propulsion engines, in which the amount of fuel bypassed through the valve 40 would be excessive thus generating substantial heat input to the fuel. Specifically, this condition can arise when an aircraft which is powered by the engine 10 is executing a descent with a minimum thrust output after high speed flight. During this condition, the rotational speed of the engine 10 is at a maximum, because of the pumping effect of the air on the compressor, while the fuel flow required to sustain combustion is at a relatively low level. Since the flow output of the positive displacement pump 26 is nearly maximum and the flow required by the nozzle 16 is at a minimum, the amount of fuel bypassed would be substantial thus introducing a substantial heat input to the fuel.

In accordance with the present invention, the amount of fuel bypassed to the inlet of the pump 26 during this condition is minimized by the means now to be described. A branch supply conduit 104 extends from the conduit 28 upstream of the metering valve 30 to a series of inlet ports 106 in the flow selector valve 74. A series of return ports 108 are provided in the valve 74 which connect with a low pressure return conduit 110, extending to the fuel tank 22. Whenever the above described operating condition exists, an operator controlled signal means 112 generates a pressure signal which is applied to the end of the spool valve element 74 via a conduit 114. This pressure overcomes the force of the spring 73 and shuttles the spool valve 74 from its illustrated position to the right. The metered fuel flow from the conduit 38 to the heat exchanger 84 is terminated and the flow from the conduit 104 is passed through the heat exchanger 84 and to the conduit 110 for delivery back to the tank 22. A substantial portion of the output of the pump 26 then passes at a relatively low pressure to the fuel tank 22 while a smaller portion of the output passes through conduit 28 for scheduling by the metering valve 30 to the fuel nozzle 16. The flow from the pump 26 which passes back to the tank 22 is directed through to the heat exchanger 84 by the flow selector valve 52 so that the fuel is continuously available as a heat exchange medium.

The heat input to the fuel as it passes along this low pressure flow path to the tank is therefore greatly minimized which enables greater utilization of the fuel as a heat exchange medium. In addition, in aircraft that use the fuel in the fuel tank 22 as a heat sink for aircraft cooling purposes, the heat input of the recirculated fuel to the fuel in the tank 22 has a negligable effect on the temperature therein. This is so because the mass of the fuel in the tank 22 is substantially greater than the mass of the fuel being recirculated to the tank 22.

In some cases, the resistance to flow of the return conduit 110 may be low enough so that the output pressure of the pump 26 is lower than the level necessary to supply fuel to the nozzles. In order to maintain the pressure output of the pump 26 during this condition, at a level sufficient to maintain the constant pressure differential across the metering valve 30, an orifice 116 may be provided in the low pressure return conduit 110. The area of the orifice 116 is selected so that a minimum pressure output from pump 26 is maintained for fuel metering and a minimum flow of fuel for cooling purposes is maintained through the heat exchanger.

When the rotational speed of the engine is substantially decreased or the fuel flow required by the nozzle 16 is substantially increased, the operator controlled signal means 112 is actuated to cause the spool valve 74 to be shuttled to the illustrated position wherein the metered fuel flow from the metering valve 30 is directed through the heat exchanger and to the nozzle 16.

While the preferred form of the invention has been described, it is to be understood that modifications will occur to those skilled in the art without departing from the spirit of the invention. Therefore, the scope of the invenion is to be determined solely from the following claims.

Having thus described the invention, what is claimed as novel and desired to be secured by Letters Patent of the United States is:

1. A fuel delivery system for a gas turbine engine having a combustor, said delivery system comprising:
   a fuel pump for pressurizing fuel, said fuel pump having an output increasing with an increasing rate of engine operation,
   means receiving the output of said fuel pump for scheduling flow of fuel,
   nozzle means receiving the output of said scheduling means for injecting the fuel into said combustor, said nozzle means having a back pressure which increases with an increasing rate of flow therethrough,
   means for throttling a portion of the output of said fuel pump to a low pressure point for maintaining the pressure output of said pump at a level required by said nozzle means,
   means for selectively providing a relatively low resistance flow path diverting a portion of the output of said pump upstream of said scheduling means to a low pressure point when the rate of engine operation is high and the flow rate through said nozzle means is relatively low,
   whereby the amount of fuel throttled to said low pressure point and the heat input to said fuel is minimized when the rate of operation of said engine is at a maximum, and the flow through said nozzle means is low.

2. A fuel control system as in claim 1 wherein:
   said selective flow path means includes;
   means for restricting the flow of fuel through said diverting flow path so that the pressure output of said pump is at a minimum level sufficient for the pressure requirements of said nozzle means during said relatively low fuel flow rate.

3. A fuel delivery system as in claim 1 wherein:
   said engine has a heat exchanger using the fuel as a cooling medium, said heat exchanger having an inlet and outlet,
   said fuel delivery system further comprises:
   passageway means for providing a flow path for scheduled fuel from said scheduling means through said heat exchanger to said fuel nozzle means,
   said selective flow path means comprises:
   passageway means for providing a low resistance flow path from the outlet of said pump through said heat exchanger to said low pressure point,
   selector valve means displaceable in said scheduled fuel passageway and said low resistance passageway,
   said valve being displaceable between a position wherein scheduled fuel passes through said heat exchanger and another wherein said low pressure fuel passes through said heat exchanger,
   whereby the fuel is continuously used as a heat exchange medium.

4. A fuel delivery system as in claim 3 further comprising:
   flow restricting bypass valve means disposed in a bypass passage between said scheduling means and said nozzle means in parallel around said selector valve for variably restricting flow of fuel from said scheduling means to said nozzle means, whereby when said selector valve means is in said first mentioned position the flow of fuel through said heat exchanger to said nozzle means is limited.

5. A fuel delivery system as in claim 4 in combination with an aircraft powered by said gas turbine engine wherein:
   said fuel delivery system further comprises:
   a fuel tank disposed in said aircraft for storage of a relatively large mass of fuel,
   supply conduit means for providing flow of fuel from said fuel tank to said pump inlet,
   bypass conduit means for providing a flow path from said throttling means to said supply conduit means upstream of said fuel pump,
   return conduit means providing a flow path from said low pressure passageway to said fuel tank,
   whereby the fuel passing through the low resistance flow path to the fuel tank generates substantially no increase in the temperature of the fuel in the tank.

References Cited
UNITED STATES PATENTS

| | | | |
|---|---|---|---|
| 2,404,428 | 6/1946 | Bradbury | 60—39.28 |
| 2,643,514 | 6/1953 | Jubb | 60—39.28 |
| 2,888,067 | 5/1959 | Kumitz | 60—39.28 XR |
| 2,907,527 | 10/1959 | Cummings. | |

JULIA E. WEST, *Primary Examiner.*

U.S. Cl. X.R.
60—39.66